United States Patent [19]

Cicatelli

[11] 4,096,536
[45] Jun. 20, 1978

[54] DEVICE FOR GRIPPING AND TRANSLATING A CASSETTE IN TAPE

[75] Inventor: Rodolfo Cicatelli, Lugano, Switzerland

[73] Assignee: Autovox S.p.A., Rome, Italy

[21] Appl. No.: 771,487

[22] Filed: Feb. 24, 1977

[30] Foreign Application Priority Data

Feb. 25, 1976 Italy .................. 48269 A/76

[51] Int. Cl.² .................. G11B 23/04; G11B 23/68; G11B 23/24
[52] U.S. Cl. .................. 360/96; 242/198
[58] Field of Search .................. 360/96, 93, 94, 83; 242/197-200

[56] References Cited

U.S. PATENT DOCUMENTS

| 3,741,496 | 6/1973 | Siegemund | 360/96 |
| 3,758,121 | 9/1973 | Walsh | 360/96 |
| 3,820,158 | 6/1974 | Schober | 360/96 |
| 3,867,722 | 2/1975 | Soyohji | 360/96 |
| 3,882,542 | 5/1975 | Nakamichi | 360/96 |
| 3,950,787 | 4/1976 | Hosaka | 360/96 |
| 3,996,618 | 12/1976 | Suzuki | 360/96 |
| 4,031,557 | 6/1977 | Ban et al. | 360/96 |

*Primary Examiner*—Alfred H. Eddleman
*Attorney, Agent, or Firm*—James W. Gillman; Donald J. Lisa; Phillip H. Melamed

[57] ABSTRACT

A device for gripping and translating a cassette inserted into a tape player is disclosed. The device comprises expandable plier like jaws which grip an inserted cassette. The jaws are mounted at one end of a movable link that is slideable, by way of a pin, in a frame slot having horizontal and vertical portions. Another end of the link has a rocker pivoted thereto and the rocker also has a pin slideable in another slot. An end of the rocker has teeth which engage a spring biased rack. A servomechanism moves the rocker pin in its slot and thereby translates an inserted cassette into desired positions in the tape player.

8 Claims, 2 Drawing Figures

DEVICE FOR GRIPPING AND TRANSLATING A CASSETTE IN TAPE

BACKGROUND OF THE INVENTION

This invention refers to a device for gripping and translating, or imparting a translatory movement to a cassette to be introduced in a tape recorder.

In cassette tape recorders in which the cassette moves into an operative position, the cassette is introduced onto a horizontal plane, for example, and then descends perpendicularly. After the reproduction or recording, the cassette ascends and is ejected.

Means permitting lowering and lifting of the cassette as well as means, generally trigger or manually operated, which permit cassette insertion and ejection are known. Technically it is not difficult to interlock a servomechanism, since tape recorders are provided with motors, for controlling the movement of the cassette. This is particularly advantageous when the cassette is required to effectuate fairly long horizontal movements for riding over the keyboard portion in a tape recorder/auto radio. This type of solution in handicapped since the reduction ratio of the insertion/ejection mechanism to the servomechanism motor is high, and therefore the movement may be irreversible.

It is to be further noted that the cassette, upon being inserted, will be subject to the force imparted thereon by the user, which force is generally quite high.

Thus, it is required that a shock absorber be arranged between the cassette and the servomechanism. Moreover, if the servomechanism is in a non-operating condition (e.g., because of power failure or breakage), then it would be desirable for the apparatus to refuse to accept the cassette.

SUMMARY OF THE INVENTION

An object of this invention is to provide a device which overcomes the aforementioned drawbacks in a very simple manner and has a very limited height, since the height dimension is always critical in such apparatus and particularly in portable tape recorders or tape recorders for automobiles.

The device according to the present invention comprises: a frame with a first slot; link means having first and second ends; a first pin fixed at the first end of said link means and slideable in the first slot; rocker means having one end pivoted at the second end of the link means; a pair of jaws for gripping a cassette, the jaws pivotally mounted to the link means; a second pin on the rocker means; and a servomechanism acting on the second pin to move the rocker means and the link means upon insertion of a cassette into the tape recorder.

Substantially the device comprises a pair of expandable jaws acting as pliers, a link which carries the pivot pins of the jaws at one end thereof, and a toothed rocker pivoted to the other end of the link and in a meshing engagement with a rack axially sliding against the action of a spring. The toothed rocker has its rotational axis slideable within a slot and is interlocked to a reducer mechanism coupled to a motor. Therefore, the device according to the invention may be considered as functioning like a spring differential wherein the fulcrum consists of the fulcrum or rotational axis of the toothed rocker and the outer arms are defined by the meshing engagement between the toothed rocker and the rack and by the coupling of the toothed rocker apex with the link.

BRIEF DESCRIPTION OF THE DRAWINGS

The invention will be better understood from the following description set forth with reference to the accompanying drawing in which.

Figure 1:
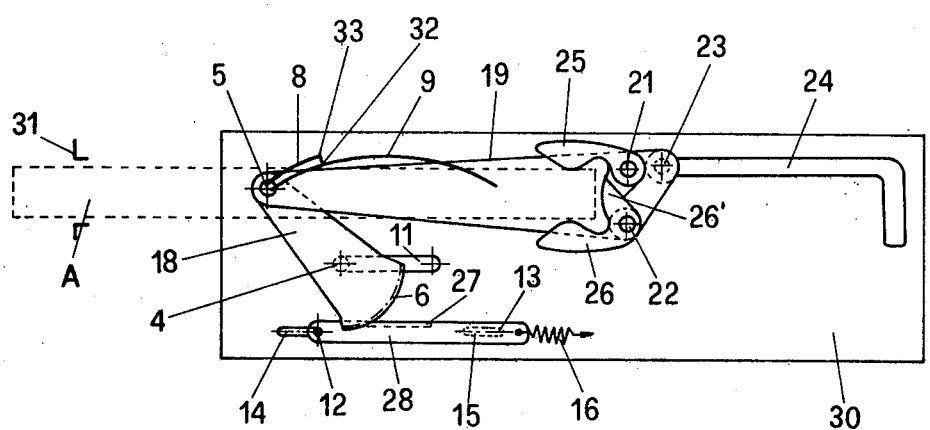
FIG. 1 is a side view of a device according to this invention.

The above drawing shows a preferred embodiment of the device in an absolutely schematic form.

DESCRIPTION OF THE PREFERRED EMBODIMENT

Referring to the drawing, a device for gripping and translating a cassette A (shown in phantom) in a tape recorder is illustrated. The device comprises a pair of expandable jaws 25, 26, acting generally as pliers and a link 19 guided by a pin 23 sliding in a slot 24. The slot 24 has a mainly horizontal portion and a vertical portion, and is located in a frame or plate 30 of the tape player. The link 19 carries pivoted at one end thereof the jaws 25, 26 by means of pins 21 and 22, respectively, and pin 23 is also located at this end. At the end of link 19 opposite to pins 23, 21 and 22, a toothed rocker 18 is pivoted to link 19 by a pin 5. The toothed rocker 18 has teeth 6 which are in meshing engagement with the toothing 27 of a rack 28. The rack 28 is provided with two pins 12 and 13 sliding within corresponding slots 14 and 15 respectively, and these pins and slots act as a guide means for the rack 28, wherein the pins 12 and 13 and the slots 14 and 15 limit the traveling path of the rack 28.

A spring 16, having one end fixed to rack 28 and the other end fixed to the frame or plate 30, urges the rack 28 towards a rest position.

The toothed rocker 18 has a pin 4 mounted to it and slideable within a slot 11 formed on the plate 30 on which slots 24, 14, 15 are also formed.

Figure 2:
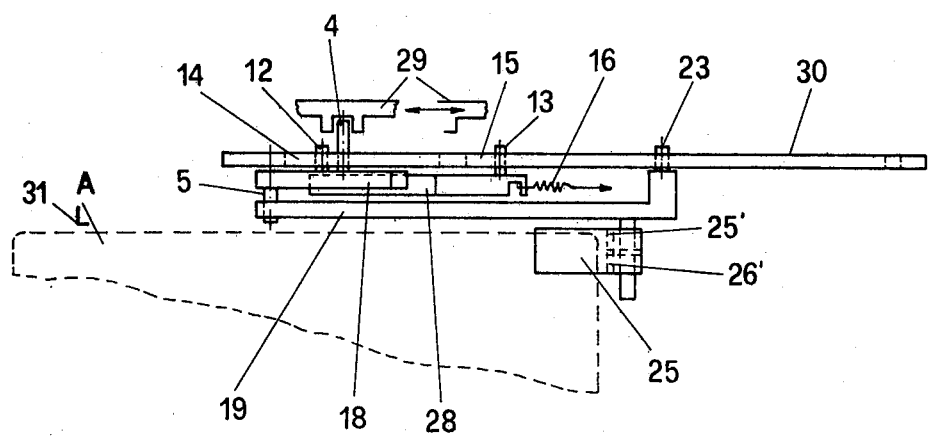
FIG. 2 is a top view of said device.

Pin 4, as best shown in FIG. 2, is controlled by a suitable known type servomechanism which causes movement of the pin 4 due to the coupling of the servomechanism with a motor. The servomechanism and the motor are not shown in the drawing for the sake of clarity. The coupling of pin 4 to the servomechanism is represented by a movable fork 29 which is to be driven by the servomechanism.

The jaws 25, 26 are positionable through discrete angles with respect to the plane of the cassette. The jaws are provided with lugs 25' and 26' which act to limit the extend of the closing movement of the jaws when the cassette A, shown in phantom in the drawing, is not inserted in the device.

Having briefly described the assembly of components which form the device contemplated by the invention, the operation thereof will now be described, whereby the structure and purpose of the device will be more apparent.

When the cassette A is introduced into the tape recorder through an insertion inlet 31, the cassette A, before arriving at the jaws 25 and 26, covers a first length in which it is guided, for example, by a suitable bearing structure, not shown in the drawing.

When the cassette A arrives at the jaws 25 and 26, the jaws, because of the funnel-like configuration of the mouth defined by them, are expanded against the action of a jaw return spring means, not shown in the drawing, and grip the cassette.

Following this operation, the assembly comprising the link 19 and jaws 25 and 26 starts its movement with the pin 23 sliding within the slot 24.

Such movement is controlled by the engagement between the fork 29 and the pin 4, the fork 29 being driven, as previously mentioned, directly or indirectly by a servomechanism coupled to the tape recorder motor.

As a result of the sliding movement of the pin 4 within the slot 11, the toothed rocker 18 rotates about the pin 4 and its toothed portion 6 rolls on the toothing 27 of rack 28 which was previously held at a rest position by the spring 16. Contemporaneously, the pin 5 travels in a cycloid path 9 as the pin 23 slides within the slot 24 until it arrives at the vertical portion of the slot 24 which allows the downward movement of the jaws 25 and 26 to be implemented by a known type of lowering and lifting means for the cassette A.

When the listening or recording operation is terminated, the cassette A is carried back to an ejection position by means of the servomechanism following the inverse cycle of the movements just described. Throughout such operation of transfer into a listening or recording position and back again into an ejection position at the end of said operation, the cassette A is always held gripped by the jaws 25 and 26 and thus it is guided such as not to be discharged energetically (forcefully) from the insertion inlet 31.

If the cassette is energetically introduced through the inlet 31, while the pushing member (e.g., the hand) is stopped at said inlet 31, the cassette will be elastically received by the jaws 25-26. This occurs since as the link 19 slides upon cartridge insertion, it displaces the pin 5 which as a result describes a circular arc path 8, and this causes rocker 18 to rotate about its fulcrum 4. This in turn causes the toothed portion 6 of rocker 18 to move the rack 28 and thereby load the spring 16.

If the fork 29 is not in operation, i.e. not being driven by a servomechanism, the cassette A will be pushed outwards at the end of the insertion pushing action by the elastic return of the spring 16 and the inversion of the cycle described above. If the fork 29 is being driven by a servomechanism, then the loading cycle previously mentioned will start.

Similarly, if at the end of the listening and/or recording period, namely at the time when the cassette A is to be pushed outwards, there exists an obstacle (e.g., a finger) outside of inlet 31 of the apparatus, the cassette cannot come out and thus also the pin 5 is stopped, for example at the point 32 of the cycloid path 9.

The pin 4, in such circumstances, can complete its normal stroke within the slot 11, inasmuch as pin 5 stopping at point 32 is permitted by the displacement of the rack 28, due to the spring 16. It should be noticed that during the latter displacement of rack 28, the pin 5 will move from the position 32 to the position 33. When the obstacle is removed, the link 19 can complete its stroke due to the action of spring 16 which, by displacing the rack 28 and toothing 6, allows the pin 5 to roll along arc 8 from point 33 in order to arrive to the end of its path shown in FIG. 1 of the drawing.

It appears evident that depending on the speed with which the pin 4 moves, or with which the user moves the cassette, the overlap of times which relate to the just mentioned sequences will be such that the pin 5 moves within that region defined between the arc path 8, the cycloid path 9 and the segment 32-33.

In consideration of the fact that the movement of rack 28 will take place upon insertion of the cassette, with pin 4 and fork 29 at rest, said movement of the rack 28 may be used to act on a control means for the servomechanism to initiate the mechanical movement of the fork 29 by coupling the fork to the drive motor, as well as to control an electrical circuit by means of a microswitch (not shown).

Although the device of this invention for gripping and translating a cassette in tape recorders has been shown and described with reference to a particular embodiment, nevertheless various changes and modifications may occur to those skilled in the art to which the invention pertains. All such changes and modifications which retain the basic underlying principles disclosed and claimed herein are within the spirit, scope and contemplation of this invention.

I claim:

1. A device for gripping and translating a cassette in tape recorders, comprising:
   plate means with a first slot;
   link means having first and second ends;
   a first pin fixed at said first end of said link means and slidable in said first slot;
   rocker means having a first end pivoted at said second end of said link means;
   a pair of expandable jaws for gripping and holding a cassette inserted therein, the jaws pivotally mounted to said link means;
   a second pin on said rocker means about which said rocker means is pivotal; and
   a servomechanism acting on said second pin to move the rocker means and pivot the rocker means about said second pin thereby moving the link means and jaws upon insertion of a cassette into the tape recorder, whereby said servomechanism implements a relatively large movement of said cassette gripping jaws.

2. A device according to claim 1 wherein said pair of jaws is pivoted on said link means at said first end thereof and said slot has a horizontal portion and a vertical portion, said jaws effectuating a first substantially horizontal and a second substantially vertical movement in response to the rocker means being moved by the servomechanism.

3. A device according to claim 1 wherein said jaws are positionable through discrete angles with respect to the plane of a cassette, and so shaped that, at rest without a cassette being inserted therein, they form a funnel access for the cassette and have lug means limiting the drawing of the jaws together and spring means biasing said jaws together.

4. A device according to claim 1 wherein the plate means has a second slot in which the said second pin is slideable and wherein said rocker means is urged towards a rest position by a spring means having one end fixed to said plate means and the other end coupled to a second end of said rocker means.

5. A device according to claim 1 wherein said plate means has a second slot in which said second pin is slideable and the rocker means has a toothed second end; said device including a rack, slideable with respect to the plate means and urged by a spring means towards a rest position, said rack in meshing engagement with said toothed end of said rocker means.

6. A device according to claim 5 wherein said rack is provided with guide means for limiting its travelling path.

7. A device according to claim 5 wherein the servomechanism controlling the movement of said link means and rocker means slides the second pin of the toothed rocker means in said second slot of plate means.

8. A device according to claim 5 wherein the rack selectively engages a control means for the servomechanism.

* * * * *